May 29, 1962     F. BARANOWSKI, JR     3,036,461
FLOWMETER

Filed Feb. 3, 1959     3 Sheets—Sheet 1

INVENTOR.
Frank Baranowski, Jr.
BY M W Goodwin

His Attorney

May 29, 1962  F. BARANOWSKI, JR  3,036,461
FLOWMETER

Filed Feb. 3, 1959  3 Sheets-Sheet 2

INVENTOR.
Frank Baranowski, Jr.
BY M W Goodwin

His Attorney

May 29, 1962   F. BARANOWSKI, JR   3,036,461
FLOWMETER

Filed Feb. 3, 1959   3 Sheets-Sheet 3

INVENTOR.
Frank Baranowski, Jr.
BY M W Goodwin
His Attorney

United States Patent Office 3,036,461
Patented May 29, 1962

3,036,461
FLOWMETER
Frank Baranowski, Jr., Lynnfield Center, Mass., assignor to General Electric Company, a corporation of New York
Filed Feb. 3, 1959, Ser. No. 790,920
5 Claims. (Cl. 73—194)

This invention relates to flowmeters and, more particularly, to a fluid mass flowmeter of the angular momentum type having a novel and improved construction.

One known construction of a fluid mass flowmeter is disclosed in U.S. Patent No. 2,714,310, issued August 2, 1955. The flowmeter of this patent generally comprises a constant speed drive motor connected to a fluid accelerating impeller mounted in coaxial longitudinally spaced relation to a turbine which is in turn mounted for resiliently restrained movement about the axis of the impeller in response to flow through the turbine of fluid angularly accelerated by the impeller. The turbine is connected to position telemetering means for providing an indication of the relative position of the turbine about its axis, the position of the turbine being representative of the mass flow of the fluid accelerated by the impeller. These elements of the flowmeter are disposed in axial alignment in a housing which is adapted to be coupled at opposite ends thereof in a fluid conduit. Such a flowmeter is often referred to as a two-element, axial flow, angular momentum type flowmeter.

There are certain instances wherein the specific arrangement of parts in a flowmeter of the construction shown in the aforementioned patent, and particularly the axially spaced longitudinal alignment of the principal elements as described above, provides an over-all length for the flowmeter which is in excess of that to be desired. It is, therefore, the primary object of this invention to provide a flowmeter of the type described in the aforementioned patent embodying a novel and improved arrangement of elements to achieve improved compactness and an over-all reduction in length compatible with certain installation requirements particularly present in aircraft usage.

Other objects of this invention will be in part obvious and in part pointed out in detail hereinafter.

Figure 1:
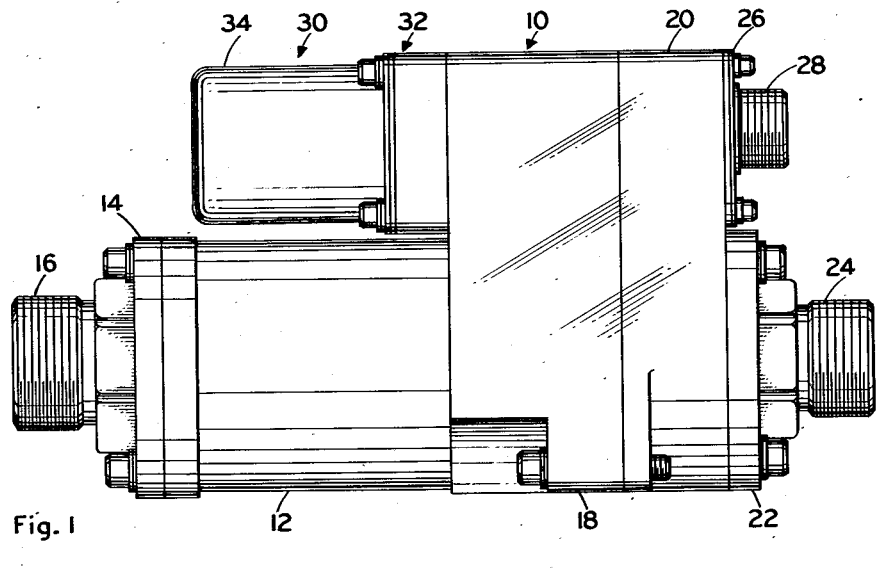
FIG. 1 is a side elevational view of a flowmeter constructed in accordance with the present invention.
Figure 2:
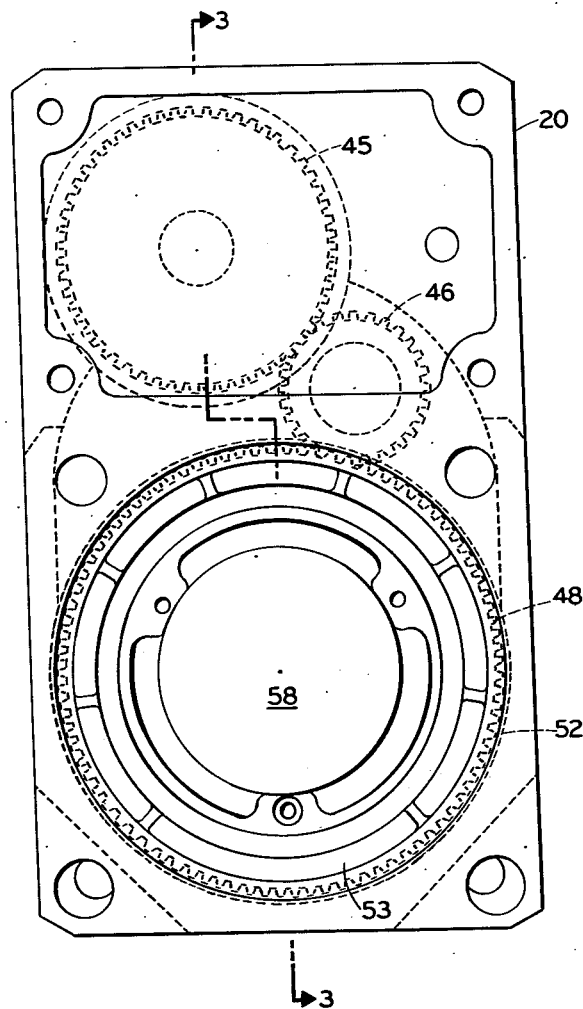
FIG. 2 is an enlarged end view of the flowmeter of FIG. 1 with certain parts removed to reveal the interior of the flowmeter.
Figure 3:
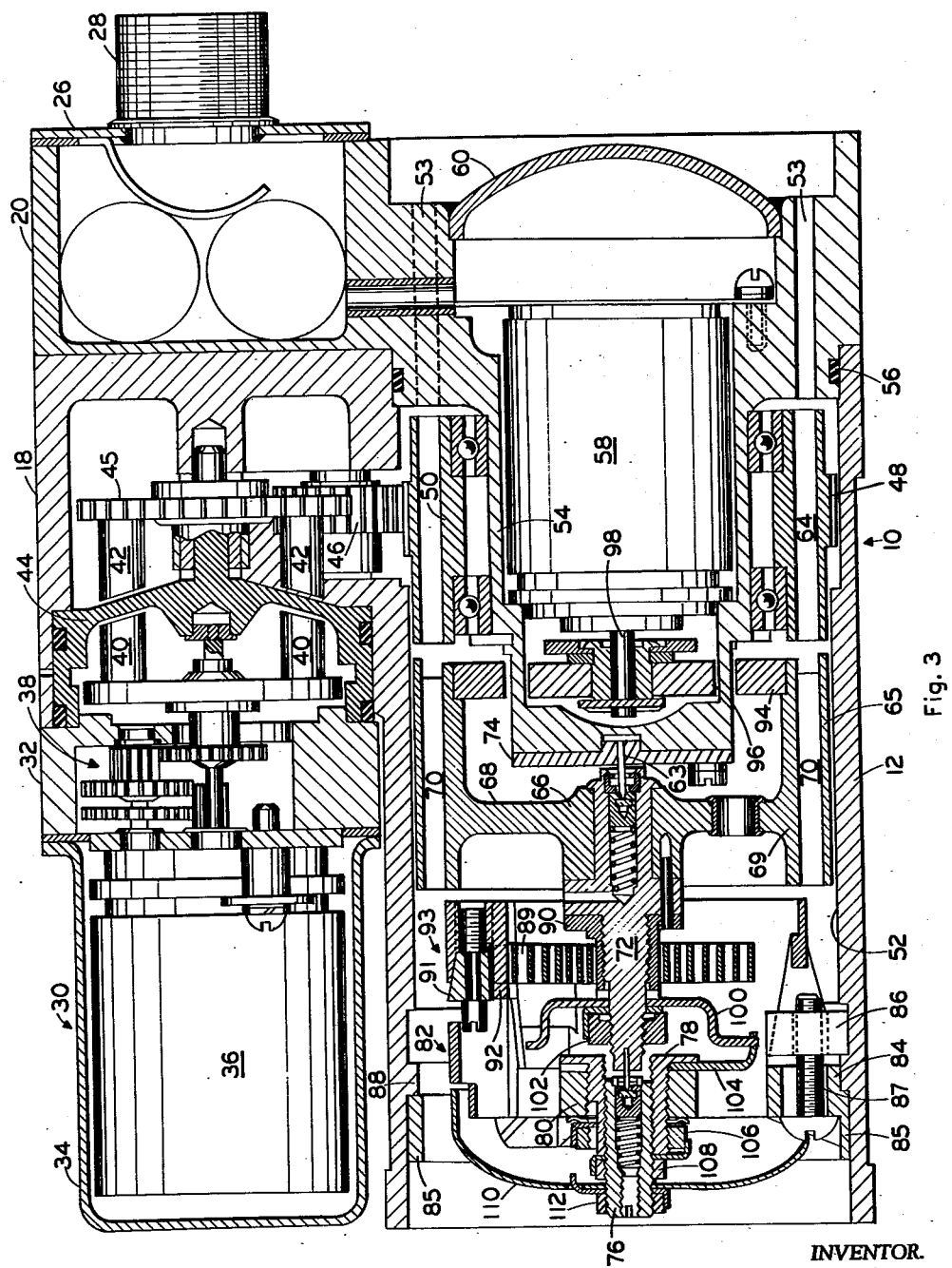
FIG. 3 is a cross sectional view taken along the line 3—3 of FIG. 2.

With reference to the drawings, particularly FIGS. 1 through 3, the flowmeter of this invention comprises a main housing 10 having a generally cylindrical portion 12 provided with a cylindrical bore which extends through the housing 10. An end plate 14 is bolted to the housing 10 at its left end, as viewed in FIG. 1, and is provided with a coupling 16 for connecting the flowmeter in a fluid conduit. The housing 10 is provided with a generally rectangular enlarged portion 18 at the right end thereof, as viewed in FIG. 1, to which is bolted an inlet strut assembly 20. An end plate 22 is bolted to the strut assembly 20 generally opposite the end plate 14 and is also provided with connector means 24 for coupling the flowmeter to a fluid conduit. A cover plate 26 is also bolted to the end piece 20 and is provided with an electrical conduit or connector 28. Bolted to the enlarged portion 18 of the housing 10 in the upper left-hand portion thereof, as viewed in FIG. 1, is a drive motor and reduction gear assembly 30 generally comprising a reduction gear housing 32 and a drive motor housing 34.

With particular reference to FIG. 3, the motor housing 34 comprises a sheet metal cup-like member in which is contained an electric drive motor 36. The motor housing 34 is bolted to the reduction gear housing 32 which contains and supports a reduction gear train 38. The reduction gear train 38 is in turn drivingly connected to a plurality of circularly arranged, rotatably mounted driving magnets 40 which cooperate with a plurality of circularly arranged driven magnets 42 disposed on the opposite side of a seal 44 to provide a magnetic coupling between the reduction gear train and a rotatable magnet carrier 45 supporting the magnets 42. The seal 44 is telescopically received in sealed relation within a recess in the enlarged portion 18 of the main housing 10 and provides a fluid seal between the interior of the housing 10 and the interior of the reduction gear housing 32. This seal 44 along with the pole face configuration of the magnets 40 and 42 forms a part of an invention covered in copending application, Serial No. 784,521, filed January 2, 1959, in the name of Philip K. Bodge. Accordingly, further details as to the structure and specific advantages of these elements will be omitted in the interest of brevity.

Figure 4:
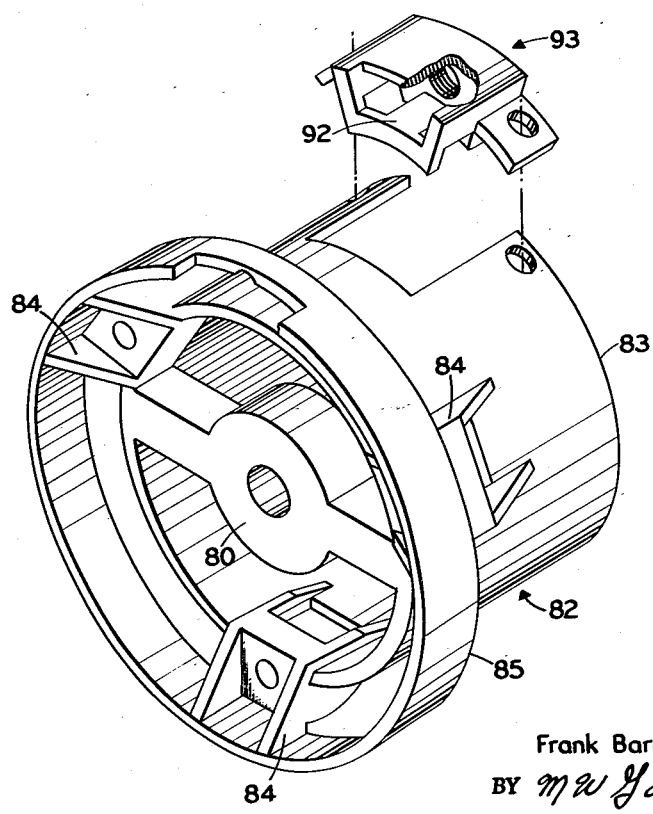
FIG. 4 is an enlarged exploded perspective view of a portion of the flowmeter.

The magnet carrier 45 is rotatably supported on a stub shaft integrally formed on the end extending coaxially from the seal 44 and supported at its outer end on a boss on the housing 10. The carrier 45 further is peripherally toothed and is engaged with an idler gear 46 rotatably supported on the housing 10 with the gear 46 in turn being drivingly engaged with the peripherally toothed portion 48 of a cylindrical impeller 50 disposed coaxially within the cylindrical bore 52 extending through the lower portion of the main housing 10. The impeller 50 is rotatably mounted on bearings on the periphery of a cylindrical housing 54 formed by a cylindrical extension of the strut assembly 20 which is fitted in sealed relation as at 56, within the rightward end of the bore 52 of the main housing. The outer end of the housing 54 is closed by a seal member 60. The assembly 20 has a flow straightener portion comprising a plurality of circularly arranged flow passages 53 extending parallel to and disposed concentrically of the longitudinal axis of the bore 52. The rightward or inlet end of these passages, as viewed in FIG. 3, communicates with the inlet fitting 24, shown in FIG. 1. The impeller 50 is a generally annular member and includes a plurality of circularly arranged fluid flow passages 64 extending longitudinally of and disposed concentrically of the longitudinal axis of the bore 52. The passages 64 are in radial alignment with the inlet passages 53 of the strut assembly 20. A reaction turbine 65 is disposed in the bore 52 in the main housing with its axis in collinear spaced relation with the axis of the impeller 50 and generally comprises a hub portion 66, a web 68 extending radially outwardly of the hub 66 and supporting a cylindrical drum 69 which is provided with a plurality of circularly arranged fluid flow passages 70 extending parallel to the longitudinal axis of the bore 52 and radially alignable with the passages 64 in the impeller. A shaft member 72 is received coaxially within the hub 66 of the turbine for movement therewith and is pivotally supported at its rightward end 63 on an end plate 74 fixed to the leftward end of the synchro housing 54 which telescopically projects into the interior of the drum 69 to provide a compact assembly. The leftward end of the shaft member 72, as viewed in FIG. 3, is pivotally supported by bearings carried by threaded insert 76 threadably received within a bushing 78 which in turn is threadably received within an annular support 80 forming an integral part of an outlet support assembly 82 which is shown in more detail in FIG. 4. As shown in FIG. 4, the outlet assembly comprises a generally cylindrical skirt or shroud member 83 supported coaxially within the bore 52 by a plurality of circularly arranged struts 84 disposed concentrically of the bore 52 and in turn surrounded by an integral ring 85 which, as shown in FIG. 3, is telescopically engaged within the bore 52 of the main housing. The outlet assembly is retained in position with the bore by means of blocks 86 which, as shown in FIG. 3, are engageable in an annular groove in the inner wall of the main housing forming the bore 52 and are threadably engageable with a clamping screw 87, the head of which is engageable with a respectively associated strut 84. The ring 85 of the outlet assembly is abuttingly engaged with an internal annular shoulder 88 within the bore 52 whereby the tightening of the clamping screws 87 will clampingly engage the ring 85 and thus the outlet assembly 82 with the main housing 10. The movements of the turbine 70 about its axis are restrained by spring 89 which, as shown in FIG. 3, is a flat coil spring arranged concentrically about the shaft member 72 with its inner end being fixed to a bushing 90 threadably received over the shaft member 72. The outer end of spring 89 is clamped between a wedge member 91 and an anvil portion 92 of a spring clamp 93 which is secured within a cut-out of skirt 83 of the outlet assembly 82, as more clearly shown in FIG. 4. The relative position of the turbine about its axis is sensed by means of a plurality of magnets 94 which are carried by the turbine drum 69 and which are preferably cast into the drum. The magnets 94 extend radially inwardly of the turbine as permitted by the telescoping arrangement of the synchro housing and drum and cooperate with a plurality of magnets 96 which are fixed for movement with and extend radially of a shaft 98 operatively connected to the synchro 58. As is well known, displacement of the shaft 98 will result in an electrical signal from the synchro which will be representative of turbine displacement about its axis. The movement of the turbine about its axis is limited by a stop member 100 fixed to the leftward end portion of the turbine shaft member 72 as viewed in FIG. 3. The stop member is clamped between a retaining nut 102 and a spacer engaged over the shaft member 72 and abutting the leftward end of the bushing 90. The stop member 100 is engageable with a stop member 104 which is a generally disc-like member engaged over the bushing 78 and having a projecting arm engaged with the stop member 100. A stop member 104 is clamped between a radially extending end flange in the rightward end of the bushing 78 and the annular support 80 of the outlet assembly 82. A retaining nut 106 locks the bushing 78 in position while the insert 76 is secured by lock nut 108 and end cap 110 is provided over the leftward end of the outward assembly 82 and the cap is retained by means of a lock nut 112 engaged over the leftward end of insert 76 as viewed in FIG. 3. In the operation of the flowmeter constructed as described, the fluid, the mass flow of which is to be measured, enters through the rightward end of the flowmeter through the passages 53 and flows through the passages 64 in the impeller. The rotation of the impeller will impart an angular momentum to the fluid generally about the axis of the impeller. The fluid accelerated by the impeller will then impinge upon the walls of the passages 70 in the turbine as the fluid flows through these passages, and it is intended that the turbine will remove from the fluid the angular momentum imparted thereto by the impeller. Accordingly, the turbine will be displaced about its axis in an amount proportional to the momentum imparted to the turbine which, as is known, is directly proportional to the mass flow of the fluid. The deflection of the turbine about its axis will be sensed through the magnets 94, 96 by the synchro 58 which will then transmit a signal representative of mass flow, which signal may be utilized to actuate an indicator to provide direct reading of mass flow.

As will be apparent from the foregoing description, particularly in connection with the accompanying drawings, the side-by-side arrangement of the motor drive unit and the impeller turbine combination provides a very compact structure and is further enhanced by the specific impeller turbine mounting arrangement shown and described. To illustrate the compactness of the unit, a specific embodiment thereof capable of handling flow capacity of approximately 6,000 pounds per hour has been constructed having an outer envelope size of approximately 3½ inches by 6 inches by 2 inches. Additionally, the mounting of the turbine as specifically shown and described provides a relatively long distance between centers of the turbine mounting to provide improved construction from the standpoint of vibration and stability. The concentric arrangement of the impeller and synchro housing provides an obvious decrease in over-all length and additionally provides a means for mounting one end of the turbine to eliminate the need for an additional bracket support or the like. The major components of the flowmeter are, as will be apparent from FIG. 3, easily assembled from the leftward end of the bore 52 of the main housing, thus facilitating assembly so as to provide a decrease in manufacturing time and cost. As will thus be seen, there is provided a flowmeter having a novel and improved construction whereby the aforedescribed objectives of compactness and overall reduction in length are achieved.

What I claim as new and desire to secure by Letters Patent of the United States is:

1. In an axial flow fluid mass flowmeter of the two element angular momentum type, a main housing having a bore and a cylindrical housing supported within the bore, position sensing means comprising a synchro disposed within said cylindrical housing, a fluid accelerating impeller disposed in the bore, said impeller surrounding the synchro and being rotatably supported on said cylindrical housing, a resiliently restrained turbine disposed within said bore and rotatably supported in collinear spaced relation to the impeller, means operatively connecting the turbine and sensing means, and means to drive the impeller disposed in generally parallel laterally spaced relation to the impeller and turbine axes.

2. In an axial flow fluid mass flowmeter of the two element angular momentum type, a main housing having a bore and a cylindrical housing supported within the bore, position sensing means comprising a synchro disposed in said cylindrical housing and extending coaxially thereof, a fluid accelerating impeller rotatably supported on said cylindrical housing surrounding said synchro, a resiliently restrained turbine disposed coaxially of and in axially spaced relation to the impeller, said turbine including a cylindrical drum-like outer portion, said cylindrical housing projecting into one end of the drum, means rotatably supporting one end of the turbine on said cylindrical housing, means rotatably supporting the other end of the turbine on the main housing, and drive means for the impeller disposed in generally parallel laterally spaced relation to the impeller axis.

3. In an axial flow fluid mass flowmeter of the two element angular momentum type, a main housing having a bore, a flow straightener received in one end of the bore, a cylindrical housing carried by the flow straightener and extending coaxially within said bore in radially inwardly spaced relation thereto, a generally cylindrical fluid accelerating impeller surrounding said cylindrical housing and being rotatably supported on the housing for rotation coaxially of said bore, a generally cylindrical turbine disposed coaxially within said bore and having a cylindrical drum-like outer portion telescopically surrounding a portion of said cylindrical housing, said turbine being disposed next adjacent the impeller and being rotatably mounted at one end on said cylindrical housing, position sensing means contained within said cylindrical housing, connecting means carried by said drum-like portion and disposed within the portion of the cylindrical housing projecting into said drum-like portion operatively connecting the turbine and sensing means, a spring disposed within said bore adjacent the other end of the turbine and connected to the turbine and main housing to restrain movement of the turbine, support means in said bore next adjacent the spring and on the opposite side of the spring from the turbine, and means in the support means rotatably supporting said other end of the turbine, and drive means for the impeller disposed in side-by-side generally parallel relation to the impeller and turbine.

4. In an axial flow fluid mass flowmeter of the two element angular momentum type, a main housing having a bore, a flow straightener having a plurality of circularly arranged linear flow passages, said flow straightener being received in the bore in sealed relation with the flow passages being arranged concentrically of the bore, a cylindrical housing carried by the flow straightener and extending coaxially within said bore in radially inwardly spaced relation thereto, a generally cylindrical fluid accelerating impeller surrounding said cylindrical housing and being rotatably supported on the housing for rotation coaxially of said bore, the impeller being provided with a plurality of circularly arranged linear flow passages disposed concentrically of said bore and in radial alignment with the flow passages in the flow straightener, a generally cylindrical turbine disposed coaxially within said bore and having a plurality of circularly arranged linear flow passages alignable with the impeller flow passages, said turbine being disposed next adjacent the impeller and being rotatably mounted at one end on said cylindrical housing, position sensing means contained within said cylindrical housing, means operatively connecting the turbine and sensing means, a spring disposed within said bore adjacent the other end of the turbine and connected to the turbine and main housing to restrain movement of the turbine about its axis, support means in said bore next adjacent the spring and on the opposite side of the spring from the turbine, means on the support means rotatably supporting said other end of the turbine, and drive means for the impeller supported on the main housing including an electric motor having a rotor axis extending in parallel laterally spaced relation to said bore.

5. In an axial flow fluid mass flowmeter of the two element angular momentum type, a main housing having a bore, a flow straightener having a plurality of circularly arranged linear flow passages, said flow straightener being received in the bore in sealed relation with the flow passages being arranged concentrically of the bore, a cylindrical housing carried by the flow straightener and extending coaxially within said bore in radially inwardly spaced relation thereto, a generally cylindrical fluid accelerating impeller surrounding said cylindrical housing and being rotatably supported on the housing for rotation coaxially of said bore, the impeller being provided with a plurality of circularly arranged linear flow passages disposed concentrically of said bore and in radial alignment with the flow passages in the flow straightener, a generally cylindrical turbine disposed coaxially within said bore and having a plurality of circularly arranged linear flow passages alignable with the impeller flow passages, said turbine being disposed next adjacent the impeller and being rotatably mounted at one end on said cylindrical housing, position sensing means contained within said cylindrical housing, means operatively connecting the turbine and sensing means, a spring disposed within said bore adjacent the other end of the turbine and connected to the turbine and main housing to restrain movement of the turbine about its axis, support means in said bore next adjacent the spring and on the opposite side of the spring from the turbine, means on the support means rotatably supporting said other end of the turbine, an electric drive motor for the impeller supported by the main housing with its rotor axis extending in parallel laterally spaced relation to the impeller axis, a magnet coupling connecting the drive motor and impeller including a pair of cooperating sets of magnets having oppositely facing pole faces, one of said sets being received in a recess in the main housing communicating with said bore, and a seal disposed in the air gap between said sets of magnets to provide a fluid-tight seal between said recess and the other set of magnets.

References Cited in the file of this patent

UNITED STATES PATENTS

| 2,529,481 | Brewer | Nov. 14, 1950 |
| 2,593,285 | Fay et al. | Apr. 15, 1952 |
| 2,602,330 | Kollsman | July 8, 1952 |
| 2,713,261 | Butterworth et al. | July 19, 1955 |
| 2,832,218 | White | Apr. 29, 1958 |
| 2,907,208 | Taylor | Oct. 6, 1959 |
| 2,914,944 | Ballard | Dec. 1, 1959 |
| 2,914,945 | Cleveland | Dec. 1, 1959 |
| 2,943,483 | Benson | July 5, 1960 |

FOREIGN PATENTS

| 717,897 | Great Britain | Nov. 3, 1954 |